Patented Mar. 11, 1941

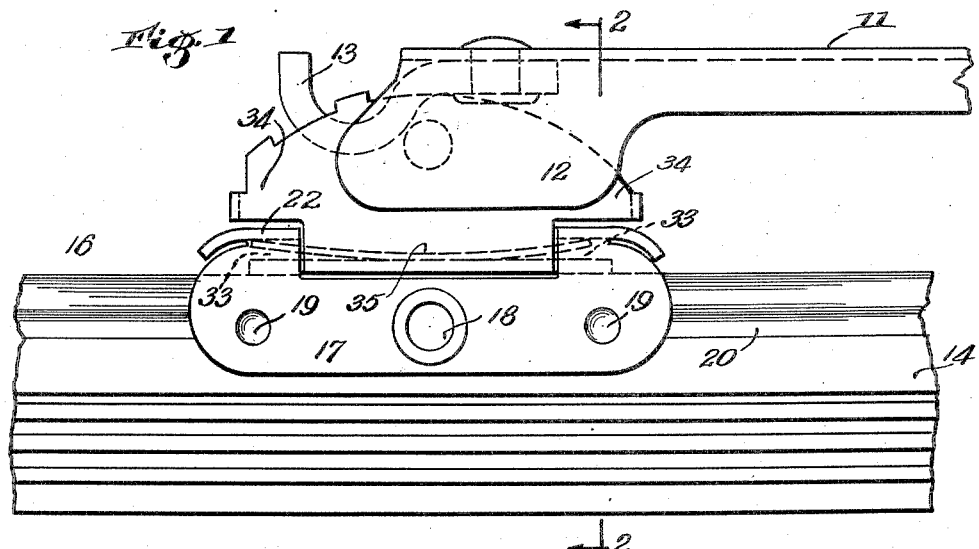
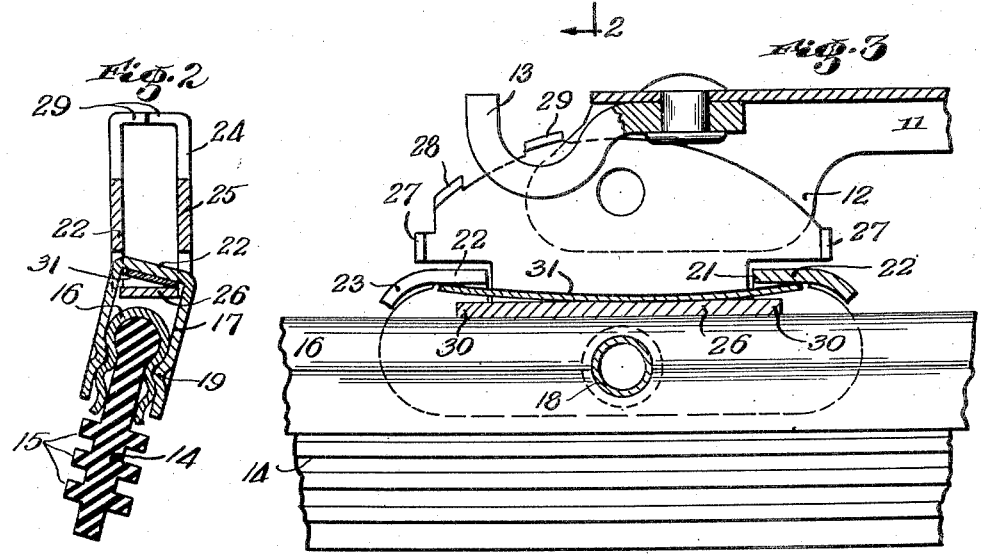
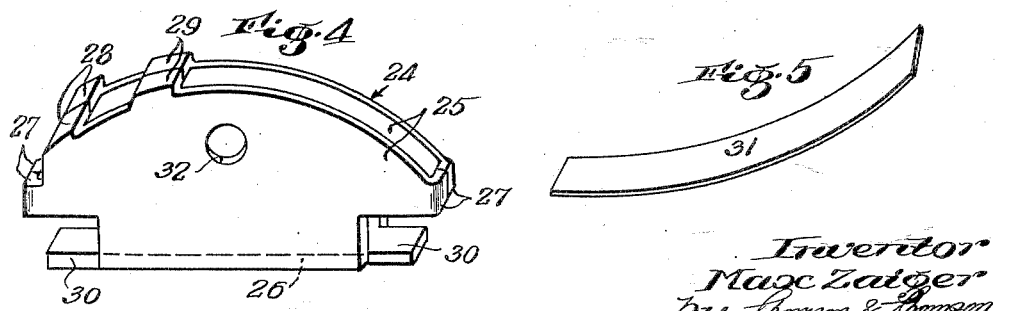

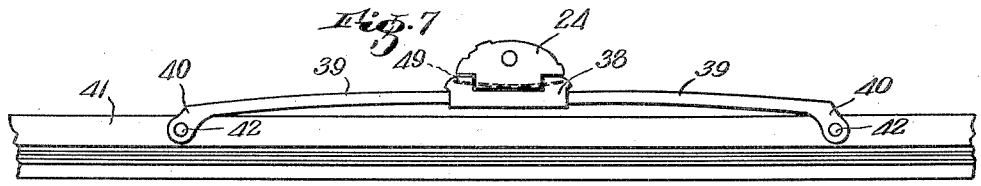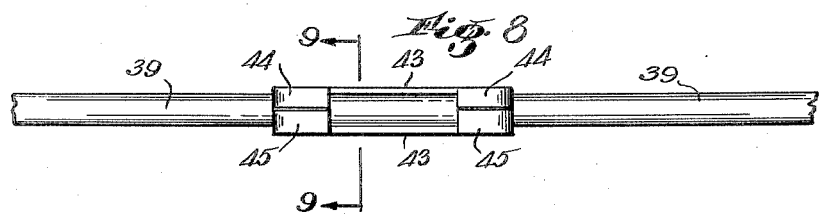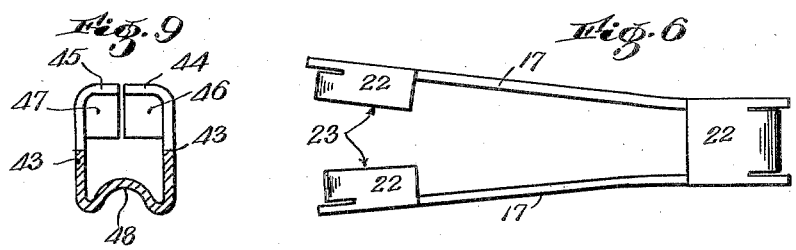

2,234,791

UNITED STATES PATENT OFFICE 2,234,791

CLIP FOR WINDSHIELD WIPERS

Max Zaiger, Swampscott, Mass.

Application July 23, 1940, Serial No. 346,943

4 Claims. (Cl. 15—250)

This invention relates to windshield wipers and pertains more particularly to improvements in connectors for removably attaching a wiper arm to a wiper blade. The principal purpose of the invention is to provide a simple, economical, and efficient connector which is flexibly attached to the wiper blade in such a manner that the blade may rock or tilt angularly with respect to the clip, and which is removably attachable to a wiper arm.

One object of the invention is to furnish a two-part, rocking connector, one part of which may be attached to the holder or shell of the blade either directly or through the medium of yoke members which transmit pressure at two widely spaced points; and the other part of which may be assembled with the first part and adjusted to proper tension before said first part is attached to the blade.

Another object is to provide such a connector with a spring or other resilient member adapted yieldingly to restrain relative angular movement between the two parts, the spring being so located that it is not readily discernible and is not likely to become dislodged during use.

Further objects of the invention reside in the structural features of the connectors hereinafter described in connection with the accompanying drawings, such features being pointed out in the appended claims.

In the drawings:

Fig. 1 is a fragmentary side elevation of a wiper blade and wiper arm connected together by the improved clip;

Fig. 2 is an enlarged transverse section taken on line 2—2 of Fig. 1 with the wiper arm omitted and showing the wiper blade tilted with respect to the clip;

Fig. 3 is a view similar to Fig. 1 showing the connector and parts of the wiper arm and blade in central longitudinal section;

Fig. 4 is a perspective view of the clip element of the connector, prior to its assembly and attachment to the blade;

Fig. 5 is a perspective view of a spring member forming part of the connector;

Fig. 6 is a plan view of the saddle element of the connector with the sides thereof flexed apart at one end to permit easy assembly of the clip member therewith;

Fig. 7 is a side elevation of a wiper blade equipped with a modified form of connector comprising a saddle member having yoke-like arms;

Fig. 8 is a plan view of the saddle member of Fig. 7 to larger scale; and

Fig. 9 is an enlarged section on line 9—9 of Fig. 8.

In the particular embodiment of the invention chosen for the purpose of illustration in Figs. 1 to 5, the improved connector is employed for removably attaching a wiper arm 11 having a U-shaped attaching portion 12 and a central hook member 13, to a wiper blade comprising a rubber wiping element 14 formed with a series of laterally projecting fins 15, and a metal holder or shell 16 crimped over the inner edge of the wiper 14.

The connector comprises a saddle member or sub-clip having spaced sides 17 which straddle the shell of the wiper blade and which are fixedly attached thereto by a central rivet 18 and by inwardly struck detents 19 engaging in a groove 20 of the holder and preventing the saddle member from turning on the rivet 18; the top of the saddle member 17 having a central opening 21, providing a pair of separated bridge members 22, spaced from the top of the blade holder 16 at the opposite ends of said member. The bridge members 22 are firmly held in spaced relation with respect to the blade holder by reason of the fixed attachment of the sides of the saddle member to said holder, thereby providing a pair of underlying pockets 33; one of said bridge members is preferably divided longitudinally at 23 (Figs. 2 and 6); and the extreme outer ends of said bridge members may be curved downwardly, but preferably terminated short of the top of the blade holder 16. It will be understood that rivets or other fastenings (not shown) may be used in place of the detents 19, in which event the center rivet may be omitted.

A clip member 24, preferably shaped from sheet metal and having spaced sides 25 integrally connected by a base 26 and held in spaced relation by inwardly bent, abutting tongues 27, 28 and 29, at the ends and top of the clip, is flexibly connected to the saddle member 17. The two parts 17 and 24 are preferably assembled before the saddle member is attached to the blade holder, by fitting the body of the clip into the opening 21 between the bridge members of the saddle, so that the projecting ends 30 of the clip base 26 are loosely received in the pockets 33 under the respective bridge members 22. The assembly is readily accomplished by flexing the sides of the saddle members 17 outwardly at the end carrying the divided bridge, said end being spread apart at the slit 23 to accommodate one end 30 of the clip base, which is dropped between the separated portions of the bridge.

The clip sides have wing portions 34, overhanging the bridge members 22, so that the web portion 35 located between said bridge members may be relatively short as compared with the length of the clip; and said wings also constitute stop members limiting rocking movement of the saddle member and blade with respect to the clip, and cooperate with the bridge members of the saddle to hold the clip and saddle in assembled relation, prior to the attachment of the assembly to the blade.

A leaf spring 31 or other resilient element is inserted intermediate the clip sides 25 and between the base 26 and the bridge members 22, with the central portion of the bowed spring bearing against said base 26 and the ends of said spring engaging under said bridges, as best shown in Fig. 3. The spring tends to press the clip base 26 toward the top of the holder 16 and thus holds the clip in normal position parallel to the blade, but readily yields to permit relative rocking movement between the wiper blade and the clip, as indicated in Fig. 2, when the wiper 15 is reciprocated across the surface of the windshield in the usual manner.

The U-shaped end 12 of the wiper arm straddles the sides 25 of the clip at the upper portion thereof, and the hook 13 which is received between said sides engages under the cross member formed by the abutting tongues 29 and behind the cross member formed by the tongues 28, thereby removably to connect the wiper arm to the clip and to the wiper blade. As the flexible connection between the clip 24 and the saddle member 17 ensures adequate rocking or tilting movement of the wiper, the attachment between the end of the wiper arm and the clip may be and preferably is firm and unyielding so that accidental detachment of the wiper arm is unlikely. The wiper arm may, however, be readily separated from the clip by tilting the arm upwardly (Fig. 1) to disengage the hook 13 and free the sides of the U-shaped member 12 from the sides of the clip 24 which they closely embrace.

In the modified form of connector illustrated in Figs. 7 to 9, the saddle member comprises a central box-like portion 38 and extended arms or yoke portions 39 having forked ends 40 which straddle the holder 41 of the wiper blade and are attached thereto by rivets 42. Said member is preferably formed from a blank of sheet metal, the yoke portions being bowed transversely and the box portion 38 consisting of upwardly bent sides 43 having inwardly bent end tongues 44 and 45 respectively which abut each other and constitute bridge members corresponding to the bridge members 22 of the saddle member 17. The tongue or bridge portions 44 and 45 are spaced above the base 48 of the box 38 and the outer ends thereof curve downwardly at 46 and 47, respectively (Fig. 9), to form pockets similar to the pockets 33 of the saddle member 17.

The clip 24 is assembled with the modified saddle member in substantially the same manner as described in connection with Figs. 1 to 6, and a tensioning spring 49 is similarly applied to hold the parts in normal position while permitting tilting or rocking movement of the saddle and blade with respect to the clip. Thus the optional form of connector operates in the same manner as the first form herein described and transmits the pressure of the wiper arm to the wiper blade at two widely spaced points, thereby insuring substantially uniform pressure on the windshield throughout the length of the blade.

It will be apparent that a connector of the character above described provides a secure but yielding attachment between the wiper arm and the wiper blade, and permits adequate angular or rocking movement between the two parts of the connector, said movement being controlled and tensioned by a spring or other resilient member disposed between the two parts and so located that it is unlikely to be dislodged and is normally concealed from view. The clip and saddle are so constructed that they may be assembled, together with the spring, before the saddle is affixed to the blade, thus permitting proper relative adjustment of the operative relationship of the parts, and ensuring that the adjustment will be maintained when the assembled connector is applied to the blade. It will also be understood that the clip herein described is adapted to receive and retain a wiper arm having a hooked end without the U-shaped portion 12, or a wiping arm having a saddle type end which may be attached to the clip by a bolt (not shown) passing through aligned openings 32 in the clip sides 25.

I claim:

1. A connector for attaching a wiper arm to a wiper blade, comprising a saddle fixed to the blade and a clip to which the wiper arm is removably connectable, the saddle having longitudinally spaced bridge members defining underlying pockets at its opposite ends, and the clip having spaced parallel sides and a base integral therewith, the base having projecting ends loosely received in the respective pockets beneath the bridge members, and the sides having projecting wings overhanging the respective bridge members, and a resilient member disposed between said sides and bearing on said base, said resilient member also extending into the respective pockets and bearing on the under side of said bridge members, thereby yieldingly to hold the parts in normal position while permitting relative angular movement therebetween when the blade is oscillated over the surface of a windshield.

2. A connector for attaching a wiper arm to a wiper blade, comprising a saddle fixed to the blade and a clip to which the wiper arm is removably connectable, the saddle having longitudinally spaced bridge members defining underlying pockets at its opposite ends, and the clip having a base formed with projecting ends loosely received in the respective pockets of the saddle, and a resilient member disposed over the base of the clip and under said bridge members so that the central portion of the resilient member bears on the clip base and the end portions thereof bear on said bridge members within said pockets, thereby yieldingly to hold the parts in normal position while permitting relative angular movement therebetween when the blade is oscillated over the surface of a windshield, one of said bridge members being divided longitudinally so that the divided portions may be spread apart to admit the end of the clip base into the pocket under said bridge member.

3. A connector for attaching a wiper arm to a wiper blade, comprising a saddle fixed to the wiper blade and having a pair of separated bridge members permanently spaced from the top of the blade, a clip to which the wiper arm is removably connectable, said clip having a base received between said bridge portions and formed with projecting ends located in the spaces between the respective bridge portions and the top of the wiper blade, and a resilient member interposed between said base and said bridge portions and bearing thereon, thereby yieldingly to hold the parts in normal position while permitting relative angular movement therebetween when the blade is oscillated over the surface of a windshield, the clip having sides formed with outwardly projecting wings overhanging the bridge members and engageable therewith to limit such movement and also to hold the parts in assembled relation before the saddle is attached to the blade.

4. A connector for attaching a wiper arm to a wiper blade, comprising a saddle fixed to the blade and a clip to which the wiper arm is removably connectable, the saddle having longitudinally spaced bridge members defining underlying pockets at its opposite ends, and the clip having spaced parallel sides and a base integral therewith, the base having projecting ends loosely received in the respective pockets beneath the bridge members, and the sides having projecting wings overhanging the respective bridge members and engageable therewith to limit angular movement of the clip relative to the saddle, and a resilient member bearing against the base of said clip for yieldingly holding the parts in normal position while permitting relative angular movement therebetween when the blade is oscillated over the surface of a windshield.

MAX ZAIGER.